United States Patent
Sambale

(10) Patent No.: US 12,028,894 B2
(45) Date of Patent: Jul. 2, 2024

(54) FIRST WIRELESS NETWORK UNIT, METHOD TO OPERATE A FIRST WIRELESS NETWORK UNIT, SECOND WIRELESS NETWORK UNIT, METHOD TO OPERATE A SECOND WIRELESS NETWORK UNIT, AND A RADIO TELECOMMUNICATIONS NETWORK

(71) Applicant: Robert Bosch GmbH, Stuttgart (DE)

(72) Inventor: Klaus Sambale, Oberhausen (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 17/635,117

(22) PCT Filed: Jul. 2, 2020

(86) PCT No.: PCT/EP2020/068690
§ 371 (c)(1),
(2) Date: Feb. 14, 2022

(87) PCT Pub. No.: WO2021/028113
PCT Pub. Date: Feb. 18, 2021

(65) Prior Publication Data
US 2022/0279539 A1    Sep. 1, 2022

(30) Foreign Application Priority Data

Aug. 13, 2019 (EP) ..................... 19191390

(51) Int. Cl.
*H04W 72/12* (2023.01)
*H04W 72/1263* (2023.01)
*H04W 72/566* (2023.01)

(52) U.S. Cl.
CPC ..... *H04W 72/569* (2023.01); *H04W 72/1263* (2013.01)

(58) Field of Classification Search
None
See application file for complete search history.

(56) References Cited

U.S. PATENT DOCUMENTS

| | | | |
|---|---|---|---|
| 2017/0127387 A1 | 5/2017 | Breuer et al. | |
| 2019/0044676 A1 | 2/2019 | Li et al. | |
| (Continued) | | | |

FOREIGN PATENT DOCUMENTS

| | | | |
|---|---|---|---|
| CN | 102138361 A | 7/2011 | |
| CN | 103733713 A | 4/2014 | |
| (Continued) | | | |

OTHER PUBLICATIONS

International Search Report and Written Opinion for Application No. PCT/EP2020/068690 dated Aug. 11, 2020 (8 pages).

*Primary Examiner* — Kouroush Mohebbi
(74) *Attorney, Agent, or Firm* — Michael Best & Friedrich LLP

(57) ABSTRACT

A method to operate a first wireless network unit (A) is provided, wherein the method comprises: determining (102) a data entity (DE) intended to be transmitted via a physical shared radio channel (PSCH); determining (104) a plurality of segments of the determined data entity (DE); determining (106) at least one first radio resource window (rw(n−1)) of the physical shared radio channel (PSCH); monitoring (108) the at least one first radio resource window (rw(n−1)); determining (110) a plurality of candidate resources (rr12, rr22) in a second resource window (rw(n)) of the physical shared radio channel (PSCH) in dependence on monitored radio resources (rr11, rr21) of the at least one first radio resource window (rw(n−1)), wherein each candidate resource (rr12, rr22) of the plurality of candidate resources (rr12, rr22) is part of a resource chain (RC1, RC2) of the physical shared radio channel (PSCH); selecting (112) one of the plurality of candidate resources (rr12, rr22) as a (Continued)

transmission start resource (rr12); and transmitting (114, 116, 118) the plurality of the determined segments of the data entity (DE) via radio resources (rr12, rr13, rr14) along the resource chain (RC1) to which the selected transmission start resource (rr12) belongs to, wherein a single one of the segments is transmitted via a single one of the radio resources (rr12, rr13, rr14) of the resource chain (RC1).

16 Claims, 14 Drawing Sheets

(56) References Cited

U.S. PATENT DOCUMENTS

| | | | |
|---|---|---|---|
| 2019/0208441 A1 | 7/2019 | Wang et al. | |
| 2020/0220694 A1* | 7/2020 | Khoryaev | H04W 28/04 |

FOREIGN PATENT DOCUMENTS

| | | |
|---|---|---|
| CN | 104067689 A | 9/2014 |
| CN | 108243458 A | 7/2018 |
| CN | 109792721 A | 5/2019 |
| CN | 109845378 A | 6/2019 |
| WO | 2018174630 A1 | 9/2018 |
| WO | 2018174661 A1 | 9/2018 |

* cited by examiner

FIRST WIRELESS NETWORK UNIT, METHOD TO OPERATE A FIRST WIRELESS NETWORK UNIT, SECOND WIRELESS NETWORK UNIT, METHOD TO OPERATE A SECOND WIRELESS NETWORK UNIT, AND A RADIO TELECOMMUNICATIONS NETWORK

FIELD

The invention relates to a first wireless network unit, a method to operate a first wireless network unit, a second wireless network unit, a method to operate a second wireless network unit, and a radio telecommunications network.

STATE OF THE ART

There are numerous different channel access mechanisms for wireless radio communication systems applying distributed scheduling. Probably, the simplest one is the so called (pure) ALOHA mechanism. Each node may access the channel at any time it has data to send. However, the duration of each transmission is fixed, i.e. each node requires the same amount of resources for each channel access. It is assumed that all nodes are within mutual reception range, and if transmissions of two or more nodes overlap, also only partially, a collision occurs and the transmitted data of all involved nodes are lost. In an optimal case the probability for accessing the medium/channel is 1/n per node and per time interval equivalent to the fixed transmission duration if n is the number of nodes in the scenario assuming each node always has data to be sent waiting in its queue. Then, the maximum normalized overall system throughput is limited to about 18% due to random collisions occurring between transmissions of different nodes.

An improvement of the (pure) ALOHA mechanism is the slotted ALOHA mechanism which divides the radio channel in fixed slots each one having exactly the size of a single transmission. New transmissions are allowed to start at the beginning of a slot, only. Thus, in case of a collision all nodes collide for the whole duration of the transmission. However, the collision probability is drastically reduced compared to (pure) ALOHA by that measure increasing the maximum normalized overall throughput to about 36%, again when assuming the n nodes to access the medium/channel with probability 1/n per slot and to always have data to be sent waiting in their queues.

Typically, radio standards employing Carrier Sense Multiple Access, CSMA, for distributed channel access provide a maximum normalized overall system throughput that does not exceed the limits of slotted ALOHA. Considering, e.g., a sensor network where all sensor nodes access the channel only applying pure ALOHA without CSMA a maximum normalized overall system throughput of 18% cannot be exceeded, but no receiver chain is required at the sensor nodes. If the sensor nodes are equipped with a light-weight receiver chain that is only able to detect if the channel is used or not complex receive amplifier gain control, an analog-digital-converter and energy consuming baseband processing which may require additional chip area to provide the necessary processing power are not required. But, this allows to employ CSMA which doubles the maximum normalized overall system throughput approaching levels of slotted ALOHA and, thus, considerably improving spectral efficiency. However, while applying CSMA already provides a great benefit a maximum normalized overall throughput of 36% (the limit of slotted ALOHA) still uses the available resources very inefficiently. If for some reason, e.g. cost or energy efficiency, it is not possible to equip the sensor nodes with a complete receiver chain and thus using feedback information, typically this limit cannot be exceeded. But, also in communication systems where all nodes implement complete receiver chains CSMA is used under several conditions, e.g. if only small amounts of data are to be transmitted at a time or a node, e.g. a mobile station, wants to request another node, e.g. a base station, to get radio resources assigned for uplink data transmission.

SUMMARY OF THE INVENTION

The problems of the prior art are solved by a first wireless network unit, a method to operate a first wireless network unit, a second wireless network unit, a method to operate a second wireless network unit, and a radio telecommunications network. Further advantages and features can be found in the depending claims as well as in the following description of examples.

According to a first aspect of this description a first wireless network unit of a radio telecommunications network is provided, wherein the first wireless network unit comprises at least one data circuitry, at least one communication circuitry and at least one antenna, wherein the at least one data circuitry is configured to interact with the at least one communication circuitry and the at least one antenna, so that the first wireless network unit determines a data entity intended to be transmitted via a physical shared radio channel; determines a plurality of segments of the determined data entity; determines at least one first radio resource window of the physical shared radio channel; monitors the at least one first radio resource window; determines a plurality of candidate resources in a second resource window of the physical shared radio channel in dependence on monitored radio resources of the at least one first radio resource window, wherein each candidate resource of the plurality of candidate resources is part of a resource chain of the physical shared radio channel; selects one of the plurality of candidate resources as a transmission start resource; and transmits the plurality of the determined segments of the data entity via radio resources along the resource chain to which the selected transmission start resource belongs to, wherein a single one of the segments is transmitted via a single one of the radio resources of the resource chain.

The proposed channel access mechanism provides some kind of semi-persistent scheduling improving the maximum normalized overall system throughput asymptotically reaching a throughput of 100% in ideal case while still only relying on the information if the channel is used or not. At a given system load level the probability of collision-free transmission of data entities is increased compared to the basic CSMA based channel access. Also in this case no feedback information from a peer node is required.

Thereby, distributed scheduling is established. Moreover, the provided method increases channel efficiency at the expense of transmission delay. Advantageously, applications with non-time-critical data benefit.

By the random selection of one of the candidate radio resources in the resource window and, thus, of the resource chain for transmission of the whole data entity collisions are not avoided at first instance but tolerated in order to reduce radio access effort. However, due to the distributed random selection over multiple resource windows an increase in bandwidth efficiency is achieved.

Moreover, the random selection is limited to the selection of one of the candidate resources as a transmission start resource of the resource chain. The first segment of the data entity is transmitted via the transmission start resource. The remaining segments are transmitted on radio resources along the corresponding resource chain whereby no further random selection takes place and, thus, no further sensing of the channel to determine sets of candidate resources is required.

The proposed mechanism is well suited for transmission of data in sensor networks or, more generally, for Internet-of-Things applications. However, the mechanism is not limited to that. In best case, it could become part of the upcoming 5G communication standard, preferably for IoT communication applications.

An advantageous example is characterized in that the first wireless network unit determines an occupation information indicating the next unoccupied radio resource of the resource chain in use for transmission of the data entity; and transmits the occupation information via the at least one radio resource of the resource chain.

Therefore, a simple mechanism is established in order to increase the overall system throughput of the physical shared radio channel by indicating the upcoming free resource of each chain. By including the occupation information into the radio resources of the resource chain, a physically separate control channel can be avoided.

An advantageous example is characterized in that the occupation information is transmitted via the at least one radio resource together with at least one of the plurality of segments.

The occupation information is advantageously transmitted as control information along the resource chain. The receivers are able to determine the next free radio resource of the resource chain in order to add the immediate successor of the last occupied radio resource to the set of candidate resources for a next transmission.

An advantageous example is characterized in that the occupation information is transmitted after the transmission of the plurality of the determined segments as at least one unoccupied radio resource of the resource chain.

By using empty radio resources for the transmission of the occupation information, the receiver chain of the wireless network units can be reduced in complexity. As sensing unoccupied radio resources can be established without fully decoding the received signals, the complexity of the decoder of the wireless network units can be reduced and/or operated in an energy-efficient manner.

An advantageous example is characterized in that the first wireless network unit determines a transmission priority for the determined data; determines a number of unoccupied radio resources along at least one resource chain; and determines the plurality of candidate resources in the second resource window of the physical shared radio channel in dependence on the determined transmission priority and in dependence on the determined number of unoccupied radio resources along the respective at least one resource chain.

Advantageously, a QoS support is established for the physical shared radio channel. For example, for a high priority the first wireless network unit starts a transmission on the first free resource of the resource chain. For a lower priority the first wireless network unit starts a transmission on the second or third radio resource of the resource chain sensed free.

An advantageous example is characterized in that the number of radio resources per transmission along the resource chain is limited by a maximum number of radio resources, and wherein the first wireless network unit determines the plurality of segments of the determined data entity in dependence on the maximum number, wherein the plurality of segments for a single transmission along the resource chain comprise at least a part of the data entity and/or a part of at least one of the plurality of segments for the single transmission is filled with padding data.

With a fixed number of radio resources for a transmission, a further parameter is established for coordinating the distributed scheduling. The fixed number of radio resources for one transmission allows the receiver to count the occupied resources and determine only by monitoring the physical shared radio channel which one of the upcoming radio resources of the resource chain is the next free radio resource available for a further transmission.

Moreover, the fixed number of radio resources provides a fixed size of a transmission along the resource chain. This increases the data efficiency of the physical shared radio channel. This efficiency increase is explained in the following. So, if transmissions are successful, all X segments are successfully transmitted, and if two transmissions collide, all X segments collide. If you have a variable number of segments per transmission, then on average $E[X]$ segments have been successfully transmitted, where $E[X]$ represents the mean of the number of segments per transmission. In the case of collisions, however, the number of segments that on average collide or can no longer be successfully combined to form a data entity is considerably greater than $E[X]$, since it is sufficient if only one segment of a very short transmission collides with a segment of a very long transmission to make it impossible to reassemble the long data entity. This means that the ratio of the segments that can no longer be used meaningfully due to collisions to the number of segments per successful transmission is greater than 1, whereas in the case of a fixed number of segments this is 1.

An advantageous example is characterized in that the first wireless network unit determines or provides a first pattern of the plurality of resource chains of the physical shared radio channel; determines a second pattern of the plurality of resource chains in dependence on monitoring the physical shared radio channel, in particular via the monitored radio resources of the at least one first radio resource window, which reside at least partly in the not yet detected radio resource windows; determines an offset between the first and second pattern; and determines a synchronized third pattern of the plurality of resource chains in dependence on the first pattern and in dependence on the determined offset in order to identify the resource chains of the physical shared radio channel.

In short, the first wireless network unit monitors the physical shared radio channel and then synchronizes with the received signals. Accordingly, a distributed synchronization scheme is provided which does not necessarily depend on dedicated synchronization signals. Therefore, control overhead is avoided in the signal domain.

An advantageous example is characterized in that the first wireless network unit determines a congestion level of the physical shared radio channel in dependence on the monitoring of the at least one first radio resource window; and selects one of the plurality of candidate resources as a transmission start resource in dependence on the determined congestion level.

By implementing such a conditional access scheme, the collision probability can be advantageously reduced and overall system load is maintained at a reasonable level. Moreover, start and end of the transmissions along the resource chain are distributed over time establishing an offset start of transmission in the telecommunications network. Therefore, the determination of the candidate resources is subject to a better distribution over the resource windows. The conditional access may therefore improve the distribution of start times and thus increase efficiency if, for example, all network units generate new data entities at the same time.

An advantageous example is characterized in that the first wireless network unit randomly or pseudo-randomly determines a transmission probability; determines a threshold in dependence on the determined congestion level; compares the determined transmission probability and the determined threshold with each other; and selects one of the plurality of candidate resources as a transmission start resource in dependence on the comparison.

By introducing the variable threshold depending on the congestion level of the physical shared channel, the distributed access scheme adapts itself to changing system load conditions on the physical shared radio channel.

An advantageous example is characterized in that the first wireless network unit determines or provides a target congestion level; and adapts the threshold in dependence on the target congestion level.

For example, the first wireless network unit determines the threshold by reducing the threshold if the determined congestion level is below the target congestion level or by increasing the threshold if the determined congestion level is above the target congestion level.

The direction in which the threshold must be changed in order to achieve a reduction or increase in congestion level depends on how the parameter representing the congestion level is defined and on how the random number drawn is compared with the threshold value.

Advantageously, this variable threshold provides a distributed congestion control. The provision of the target congestion level guarantees that there are sufficient candidate resources available for transmissions via the physical shared radio channel in order to maximize throughput or achieve a specific target packet error rate.

An advantageous example is characterized in that the first wireless network unit determines a further data entity intended to be transmitted via the physical shared radio channel; determines a plurality of segments of the determined further data entity; determines at least the second radio resource window of the physical shared radio channel; monitors at least the second radio resource window; determines a plurality of candidate resources in a third resource window of the physical shared radio channel in dependence on monitored radio resources of at least the second radio resource window, wherein each candidate resource of the plurality of candidate resources is part of a resource chain of the physical shared radio channel; selects one of the plurality of candidate resources as a transmission start resource; and transmits the plurality of the determined segments of the data entity via radio resources along the resource chain to which the selected transmission start resource belongs to, wherein a single one of the segments is transmitted via a single one of the radio resources of the resource chain.

Advantageously, the first wireless network unit uses a plurality of radio resources per resource window. Even subsequent resource windows can be used for starting a transmission along a respective one of the resource chains. The only limitation is that the provided access scheme is used in order to avoid an increased collision probability.

An advantageous example is characterized in that the first wireless network unit randomly or pseudo-randomly selects the one of the plurality of candidate resources as a transmission start resource.

The random selection of the transmission start resource advantageously provides the distributed access procedure. Given that a sufficient number of candidate resources can be determined, a resulting collision probability of the transmissions is tolerable.

According to a second aspect of this description a method to operate a first wireless network unit is provided, wherein the method comprises: determining a data entity intended to be transmitted via a physical shared radio channel; determining a plurality of segments of the determined data entity; determining at least one first radio resource window of the physical shared radio channel; monitoring the at least one first radio resource window; determining a plurality of candidate resources in a second resource window of the physical shared radio channel in dependence on monitored radio resources of the at least one first radio resource window, wherein each candidate resource of the plurality of candidate resources is part of a resource chain of the physical shared radio channel; selecting one of the plurality of candidate resources as a transmission start resource; and transmitting the plurality of the determined segments of the data entity via radio resources along the resource chain to which the selected transmission start resource belongs to, wherein a single one of the segments is transmitted via a single one of the radio resources of the resource chain.

Reference is made to the advantages of the first aspect.

According to a third aspect of this description a second wireless network unit of a radio telecommunications network is provided, wherein the second wireless network unit comprises at least one data circuitry, at least one communication circuitry and at least one antenna, wherein the at least one data circuitry is configured to interact with the at least one communication circuitry and the at least one antenna, so that the second wireless network unit monitors a second radio resource window; determines that at least one of a plurality of candidate resources of the second radio resource window is a transmission start resource; receives a plurality of segments via radio resources along a resource chain to which the determined transmission start resource belongs to, wherein a single one of the segments is received via a single one of the radio resources of the resource chain; and determines a data entity in dependence on the plurality of received segments.

Reference is made to the advantages of the first aspect. Furthermore, according to an example, the transmission start resource comprises a network-wide known signature, so that the receiver in form of the second wireless network unit determines the presence of the transmission start resource by a comparison.

According to a fourth aspect of this description a method to operate a second wireless network unit of a radio telecommunications network is provided, wherein the method comprises: monitoring a second radio resource window; determining that at least one of a plurality of candidate resources of the second radio resource window is a transmission start resource; receiving a plurality of segments via radio resources along a resource chain to which the determined transmission start resource belongs to, wherein a single one of the segments is received via a single one of the radio resources of the resource chain; and determining a data entity in dependence on the plurality of received segments.

Reference is made to the advantages of the first aspect.

According to a fifth aspect of this description a radio telecommunications network comprising the first wireless network unit according to the first aspect and the second wireless network unit according to the third aspect is provided.

DETAILED DESCRIPTION

Figure 1:
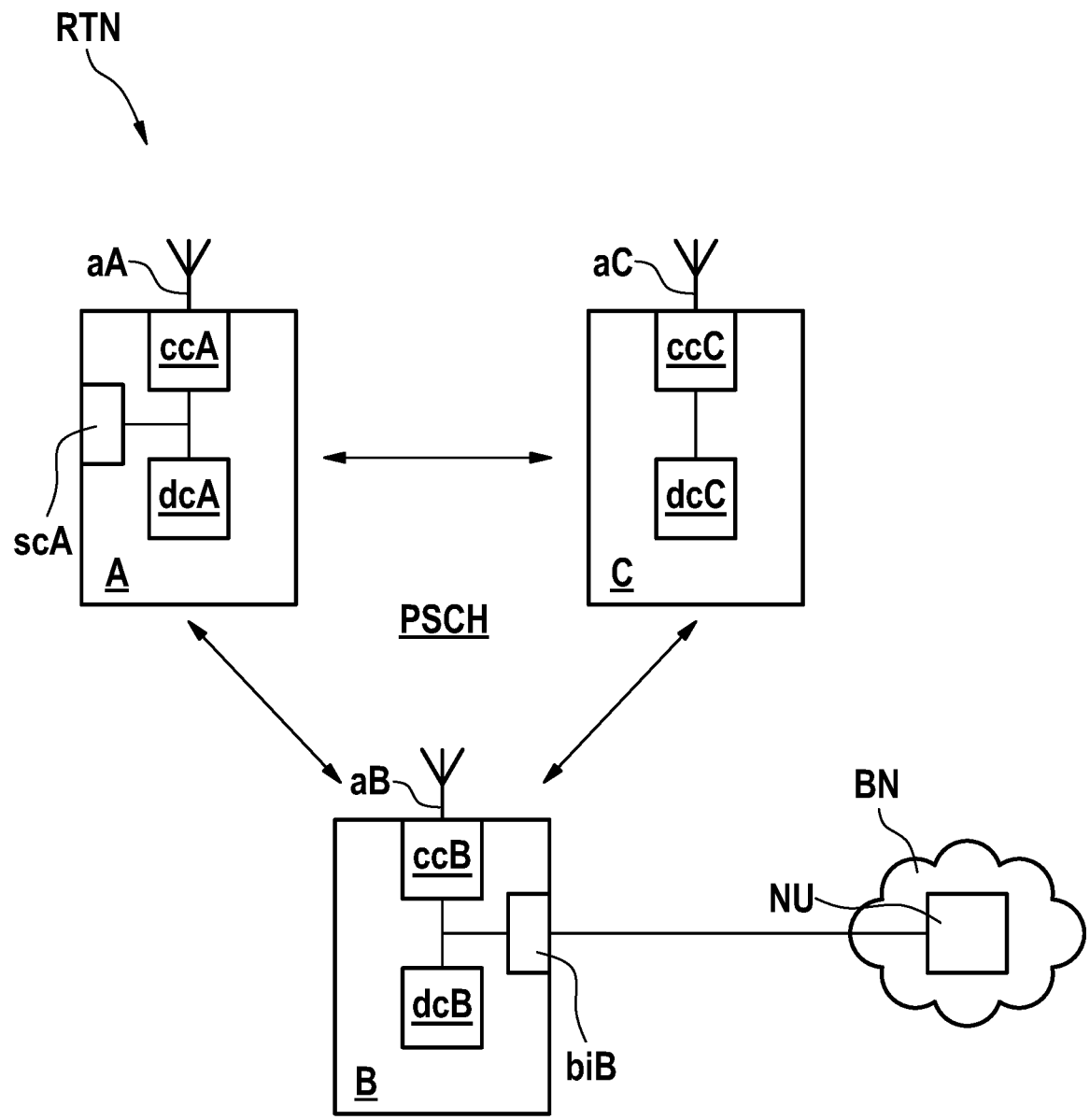
FIG. 1 depicts schematically a radio telecommunications network.

FIG. 1 depicts schematically an exemplary radio telecommunications network RTN. The radio telecommunications network RTN is made up of three wireless network units A, B, and C. The wireless network unit A, B, C of the radio telecommunications network RTN comprises at least one data circuitry dcA, dcB, dcC, at least one communication circuitry ccA, ccB, ccC and at least one antenna aA, aB, aC. The at least one data circuitry dcA, dcB, dcC is configured to interact with the at least one communication circuitry ccA, ccB, ccC and the at least one antenna aA, aB, aC, so that the wireless network unit A, B, C conducts the method steps of this description.

The wireless network units A, B, C exchange data directly with each other via a physical shared radio channel PSCH.

For example, the first wireless network unit A comprises a sensor circuity scA providing a sensor value and the second wireless network unit B comprises a backhaul interface biB to exchange data with a network unit NU of a backhaul network BN. Overall, this communication scheme is referred to as Internet of Things (IoT). In this use case the proposed mechanism provides a cost benefit. If a sensor network is used to monitor, e.g., the temperature in a room a certain number of wireless network units is required to get a precise picture of the temperature distribution. However, it is not required to periodically receive the measurement data of all sensors as the temperature gradient within the room is limited over location and time. Hence, methods of compressed sensing can be applied to interpolate missing measurements. However, a certain number of measurements is needed, periodically, for a given resolution. This requires in turn a certain number of sensors with a wireless network unit, wherein the number is higher than the number of measurements needed due to random collisions occurring and as consequence lost measurement data. As the number of collisions is reduced by the proposed mechanism the number of sensor nodes can be also reduced, as long as the number of measurements received is still sufficient. This may lower the overall costs for the sensor network.

For example, the radio telecommunications network RTN is a cell-based network with a central radio managing entity providing a synchronization signal to the wireless network units A, B, C. In another example, the radio telecommunications network RTN is an adhoc network, where each one of the wireless network units A, B, C synchronizes itself to the data traffic it receives without using a dedicated synchronization signal. For example, the wireless network unit B is the managing entity for the cell and provides the mentioned synchronization signal. However, the synchronization signal can also be omitted and a de-central communication is possible.

Figure 2:
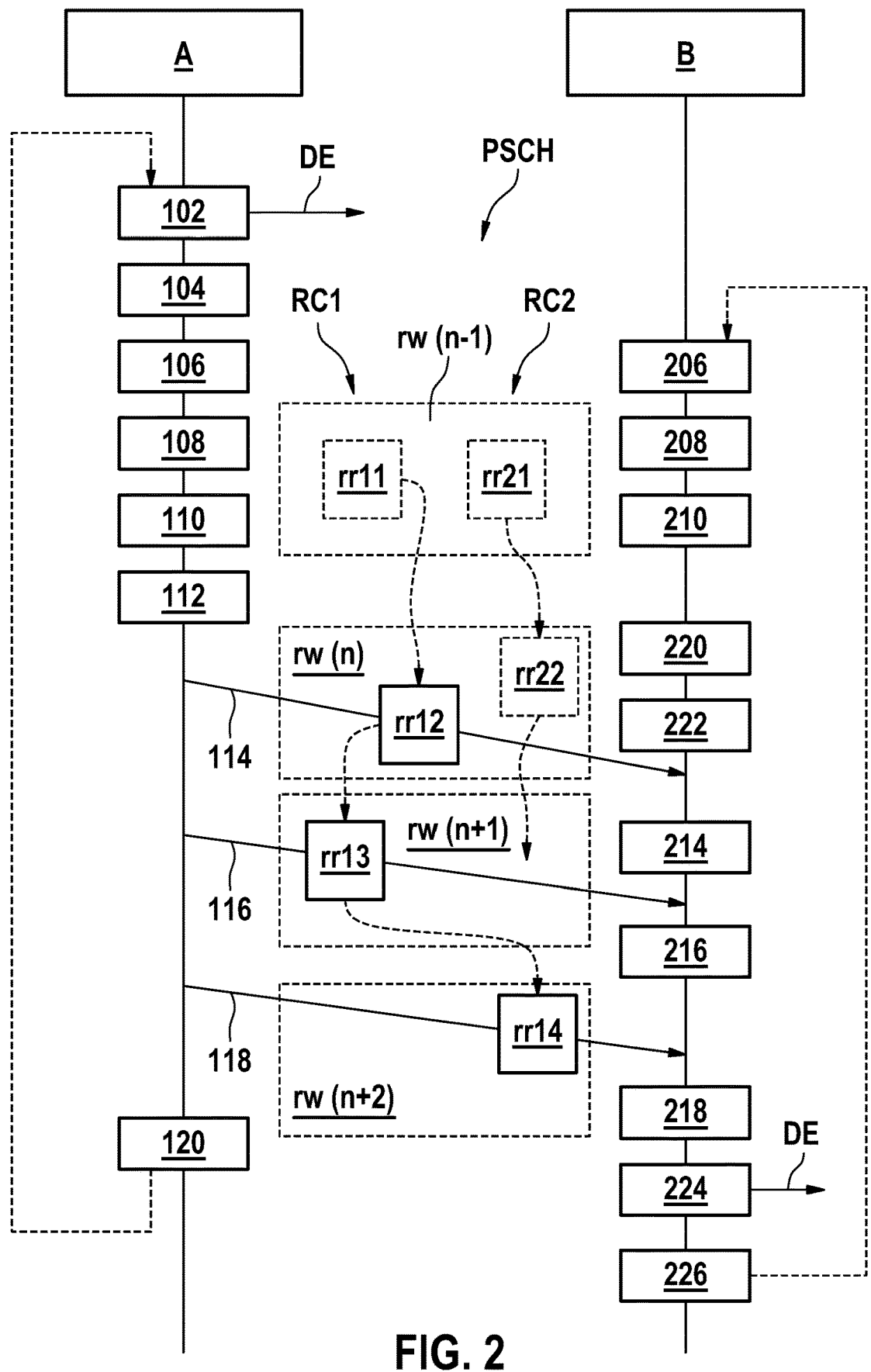
FIG. 2 depicts schematically a sequence diagram.

FIG. 2 depicts schematically a sequence diagram. The wireless network unit A determines according to a step 102 a data entity DE intended to be transmitted via the physical shared radio channel PSCH. The wireless network unit A determines according to a step 104 a plurality of segments of the determined data entity DE. According to a step 106 at least one first radio resource window rw(n−1) of the physical shared radio channel PSCH is determined. The step 106 comprises, e.g., determining the boundaries of the first radio resource window and/or further resource windows. The wireless network unit A monitors according to a step 108 the at least one first radio resource window rw(n−1). In a step 110 the wireless network unit determines a plurality of candidate resources rr12, rr22 in a second resource window rw(n) of the physical shared radio channel PSCH in dependence on monitored radio resources rr11, rr21 of the first radio resource window rw(n−1). Each candidate resource rr12, rr22 of the plurality of candidate resources rr12, rr22 is part of a resource chain RC1, RC2 of the physical shared radio channel PSCH. According to a step 112 the wireless network unit A selects one of the plurality of candidate resources rr12, rr22 as a transmission start resource, in this example the candidate resource rr12.

According to an example, the step 112 comprises randomly or pseudo-randomly selecting the one of the plurality of candidate resources rr12, rr22 as a transmission start resource, in this example the candidate resource rr12.

According to steps 114, 116, 118 the wireless network unit A transmits the plurality of the determined segments of the data entity DE via radio resources rr12, rr13, rr14 along the resource chain RC1 to which the selected transmission start resource rr12 belongs to, wherein a single one of the segments of the data entity DE is transmitted via a single one of the radio resources rr12, rr13, rr14 of the resource chain RC1.

According to another example, the resource windows rw(n−1), rw(n), rw(n+1) and rw(n+2) do not necessarily directly follow each other without further intermediate time periods in between. Instead, there can be at least one further resource window between the successive resource windows rw(n−1), rw(n), rw(n+1) and rw(n+2), wherein the further resource window is not shown in FIG. 2. These further resource windows are at least temporarily not used by the wireless network nodes A and B, for example because a node that is switching from a monitoring to a transmitting mode may neither monitor nor transmit on the corresponding radio resource of the respective resource chain. This embodiment is exemplified by giving another meaning to FIG. 2 in the following sentences of this paragraph, wherein the resource window rw(n) represents such further resource window. So, for example, the wireless network unit A determines a plurality of candidate resources in the third resource window rw(n+1) of the physical shared radio channel PSCH in dependence on monitored radio resources rr11, rr21 of the first radio resource window rw(n−1). Each candidate resource of the plurality of candidate resources is part of a respective further resource chain of the physical shared radio channel PSCH. The wireless network unit A selects one of the plurality of candidate resources as a transmission start resource, in this example the candidate resource rr13. Then, the wireless network unit A transmits the plurality of the determined segments of the data entity DE via radio resources along the resource chain to which the selected transmission start resource belongs to, wherein a single one of the segments of the data entity DE is transmitted via a single one of the radio resources of the resource chain.

According to a step 120 the transmission of the data entity DE ends and a subsequent access procedure can be started. Of course, the process described with respect to the channel access and transmission of the data entity is conducted in a parallel manner in order to transmit further data entities.

The wireless network unit B determines according to a step 206 at least one first radio resource window rw(n−1) of the physical shared radio channel PSCH. According to a step 208 the wireless network unit B monitors the at least one first radio resource window rw(n−1). The wireless network unit B determines according to a step 210 a plurality of candidate resources rr12, rr22 in a second resource window rw(n) of the physical shared radio channel PSCH in dependence on monitored radio resources rr11, rr21 of the at least one first radio resource window rw(n−1). A signature of the segment transmitted on radio resource rr12 can also indicate that a new transmission starts. If signatures are used, steps 206, 208 and 210 represent some kind of synchronization process in order to correctly receive data from the first network unit A. In case that the network unit B is already synchronized, steps 206, 208, and 210 may be omitted.

Each candidate resource rr12, rr22 of the plurality of candidate resources rr12, rr22 is part of one of the resource chains RC1, RC2 of the physical shared radio channel PSCH. However, departing from this example, at least two of the resource chains RC1, RC2, RC3, RC4 may be interconnected by sharing at least one radio resource rr. This means that the resource chains RC1, RC2, RC3, RC4 may branch and unite. In result, a usage of one radio resource by at least two resource chains is possible.

The wireless network unit monitors according to a step 220 the second radio resource window rw(n). The wireless network unit B determines according to a step 222 that at least one of the plurality of candidate resources rr12, rr22 of the second radio resource window rw(n) is a transmission start resource, in this example the candidate resource rr12. According to steps 214, 216, 218 the wireless network unit B receives a plurality of segments via radio resources rr12, rr13, rr14 along the resource chain RC1 to which the determined transmission start resource rr12 belongs to. A single one of the segments is received by the wireless network unit B via a single one of the radio resources rr12, rr13, rr14 of the resource chain RC1. According to a step 224 the wireless network unit B determines a data entity DE in dependence on the plurality of received segments.

According to a step 226 the reception of the data entity DE ends and a subsequent reception procedure can be started. Of course, the process described with respect to the channel monitoring and reception of the data entity DE is conducted in a parallel manner in order to receive further data entities.

Figure 3:
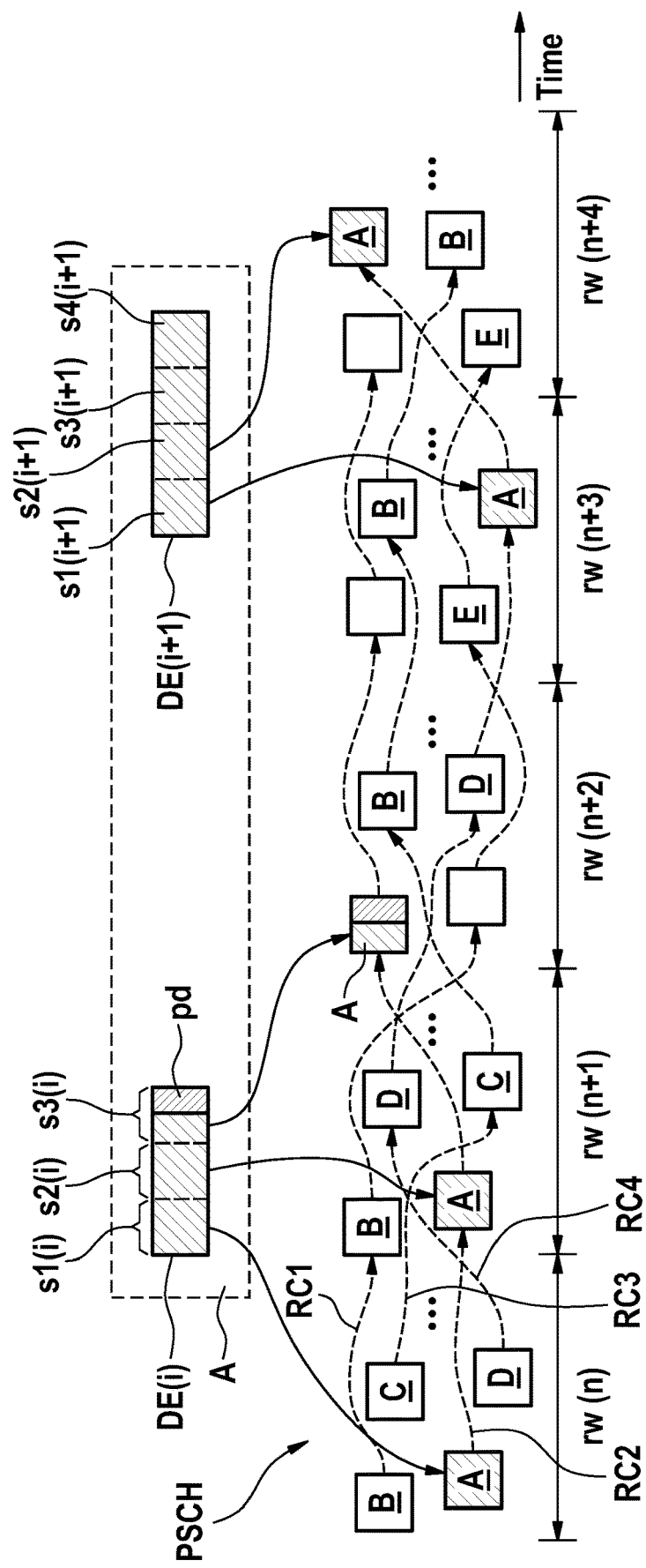
FIGS. 3 to 10 and 14 each depict schematically transmissions via a physical shared radio channel.

FIG. 3 depicts schematically transmissions via the physical shared radio channel PSCH via resource chains RC1, RC2, RC3, RC4. Data entities DE(i) and DE(i+1) are determined by the wireless network unit A in order to be transmitted via the physical shared radio channel PSCH. Equally sized segments s1(i), s2(i), s3(i), s1(i+1), s2 (i+1), s3(i+3), s4(i+1) are determined in dependence on the respective data entities DE(i) and DE(i+1). If the data entity DE(i) does not fit into a sum of available segments, padding data pd is inserted, for example at the end of the last segment s3(i). In other words, if the size of the data entity DE(i) does not exactly fit into the summed size of a plurality of available segments padding data is inserted into at least one of the segments. Therefore, the plurality of segments for a single transmission along the respective resource chain comprises at least a part of the data entity DE or a part of the plurality of segments of the data entity DE is filled with padding data.

One of the dimensions for using the physical shared radio channel PSCH is time. Further dimensions like frequency and/or code establish the radio resources. For reasons of better overview, the occupied resources are marked with the letter of the wireless network unit transmitting via this radio resource. An unoccupied radio resource is marked with no letter and therefore remains marked empty. This applies for this and the forthcoming figures.

According to an example, the number of radio resources per transmission along one of the resource chains is limited by a maximum number of radio resources. In this case, the wireless network unit A-E determines the plurality of segments of the determined data entity DE in dependence on the maximum number.

According to an example for the time domain split, each radio resource is mapped to only one resource chain per resource window. This provides from a theoretical point of view a minimum distance in time between subsequent radio resources of the corresponding resource chain of zero and a maximum distance of the distance in time of two consecutive resource windows rw minus the distance in time of two radio resources.

Of course, a resource of a resource window rw can also be mapped to several resource chains RC1-RC3, i.e. that a resource is part of two or more resource chains RC. However, in order to achieve maximum efficiency a resource should always only be part of a single resource chain.

The first radio resource in resource window rw(n) in which the wireless network unit A transmits is the transmission start resource. Accordingly, the third radio resource, on which the wireless network unit A transmits in resource window rw(n+2), is the transmission end resource.

All radio resources (boxes) referred to have the same size and are fully orthogonal to each other meaning that transmissions on different radio resources do not interfere with each other. In this example, each resource window rw contains the same number R of radio resources while each radio resource belongs to exactly one resource window rw, i.e. resource windows do not "overlap" as seen from the point of one wireless network unit. Subsequent resource windows rw differ in time domain. The radio resources are chained over the resource windows according to the resource chains RC, i.e. each radio resource has exactly one peer radio resource in the following resource window and so on. The chaining pattern is equal and known to all wireless network units in the scenario. If wireless network unit A wants to transmit a single data entity it splits the data entity into segments of the size of one radio resource and transmits the first segment in a radio resource—one of the candidate resources—it has assessed to be free. The second segment is transmitted in the peer radio resource of the resource chain RC in the succeeding resource window and so on. For another data entity these steps are applied, accordingly.

This mechanism increases the transmission latency as the transmission is stretched in time. However, if the distance of the radio resources in time domain belonging to a single chain is short this additional latency can be kept at reasonable levels. Additionally, data such as temperature readings of sensor nodes are not as time critical so that a small additional transmission delay (probably in the range of milliseconds) is tolerable.

Figure 4:
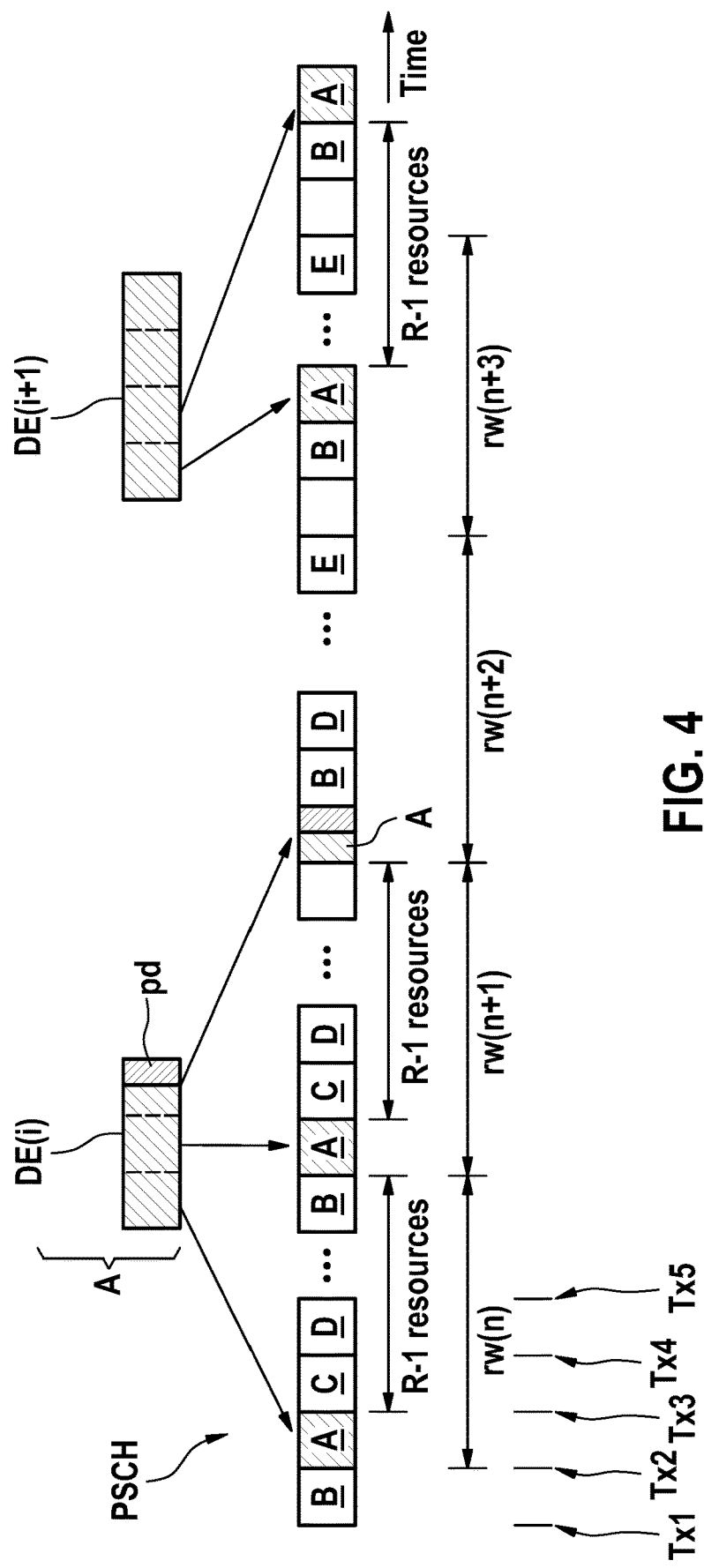

FIG. 4 depicts schematically transmissions via the physical shared radio channel PSCH for a time domain, only, split of radio resources. The physical shared radio channel PSCH is split in radio resources (slots) of fixed size with Tx start opportunities Tx1 to Tx5 only at the beginning of each radio resource. Additionally, a fixed number of R consecutive radio resources comprise a resource window rw. The number R is fixed for all resource windows of a wireless network unit and is also equal for all wireless network units in the scenario. The resource windows rw do not overlap but follow each other, directly, without a gap.

If wireless network unit A wants to transmit the data entity DE(i) it is split into segments of the size of a single radio resource, possibly padding the last segment with padding data pd, accordingly. Then, wireless network unit A randomly picks a candidate radio resource it has assessed to be free within a resource window rw and transmits the first segment on that transmission start resource. Without any further sensing the wireless network unit A uses the corresponding radio resource in the subsequent resource window (R-1 resources apart) for transmission of the second segment and so on. If another data entity should be transmitted the wireless network unit A performs the same steps, again, using a different randomly picked free candidate radio resource. The sensing mechanism is used to assess which resources are free and thus candidate radio resources as well as to synchronize the Tx start opportunities of different wireless network units and thus the positions of the radio resources in time domain.

Figure 5:
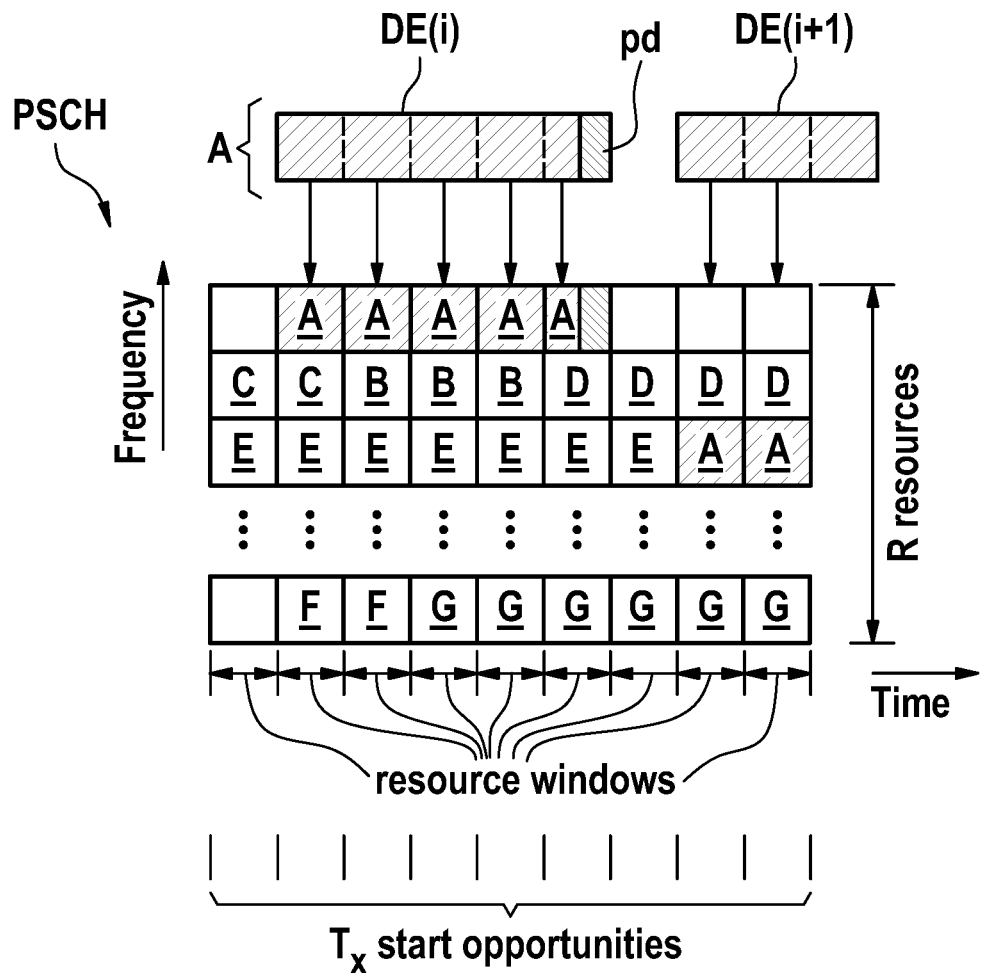

FIG. 5 depicts schematically transmissions via the physical shared radio channel PSCH. The proposed mechanism also works in frequency domain as shown. The physical shared radio channel PSCH is split into radio resources of fixed size in time and frequency domain. In this example, the resource windows rw span only a single radio resource in time domain, but for sure, they may also span multiple radio resources yielding a combined TD-/FDMA operation. The number of radio resources in a resource window rw equals, in this example, the number of different frequency subchannels. The Tx start opportunities, in FIG. 5 marked with respective lines, are only at the start of a radio resource. In this example where the resource window spans a single resource in time domain, only, a wireless network unit that wants to transmit a data entity DE actually does not really need to segment the data entity DE, but may start its transmission at the start of a radio resource it has assessed to be free thus being a candidate radio resource. For sure, this is different if the resource window rw spans multiple radio resources in time domain. For a succeeding data entity DE(i+1) the wireless network unit has to perform the same steps, again.

Figure 6:
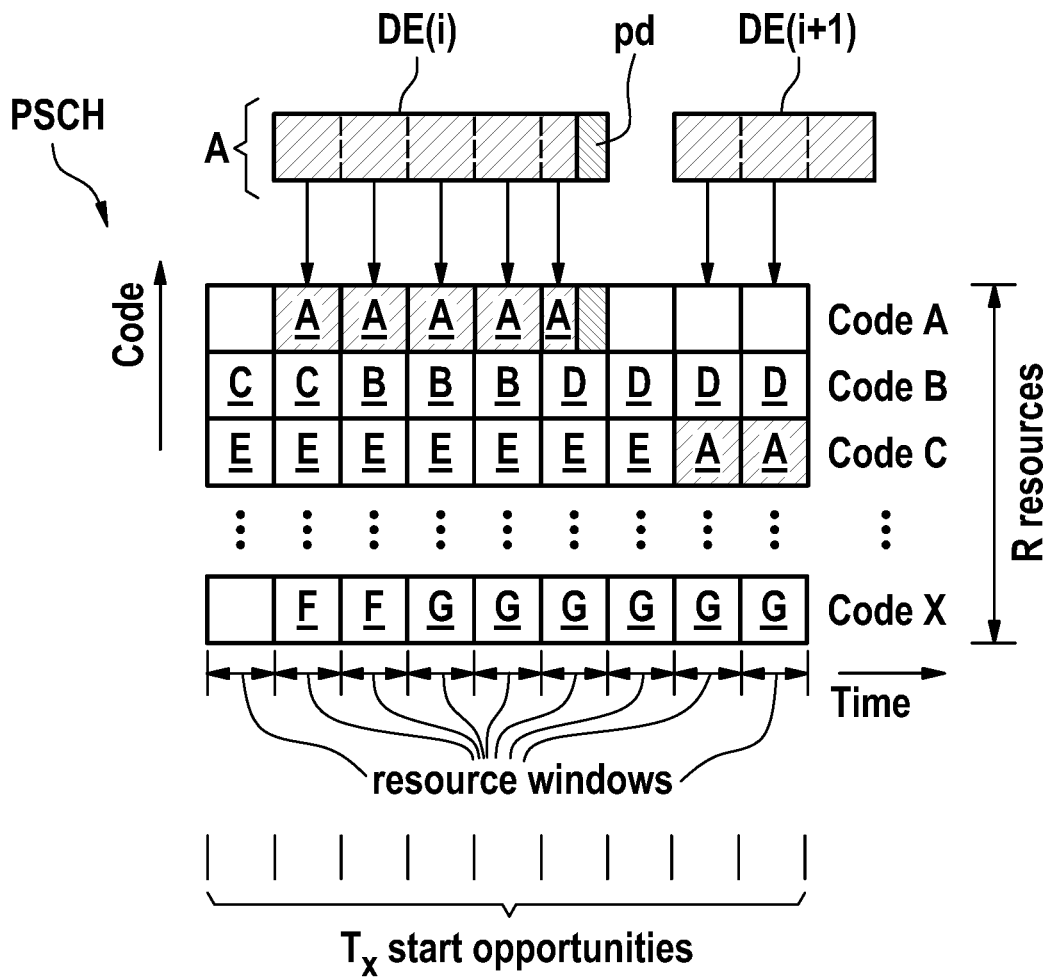

FIG. 6 depicts schematically transmissions via the physical shared radio channel PSCH. The proposed mechanism is generic so that it can be also applied in code domain. It works, accordingly, as in frequency domain but with the difference that the radio resources do not differ in frequency but code domain. For sure, all combinations of these and probably further domains are also possible. For example, there are scenarios where the different wireless network units have different capabilities concerning the transmission times, e.g. due to processing delays possibly not in all radio resources a segment could be transmitted, concerning the channel bandwidths, e.g. a wireless network unit supporting a smaller bandwidth might be cheaper, or concerning the supported codes in code domain. According to an example, all wireless network units assume the same resource window and simply "block" those radio resources, i.e. they never can be assessed to be free and thus never become a candidate radio resources, which are not matching their capabilities.

Figure 7:
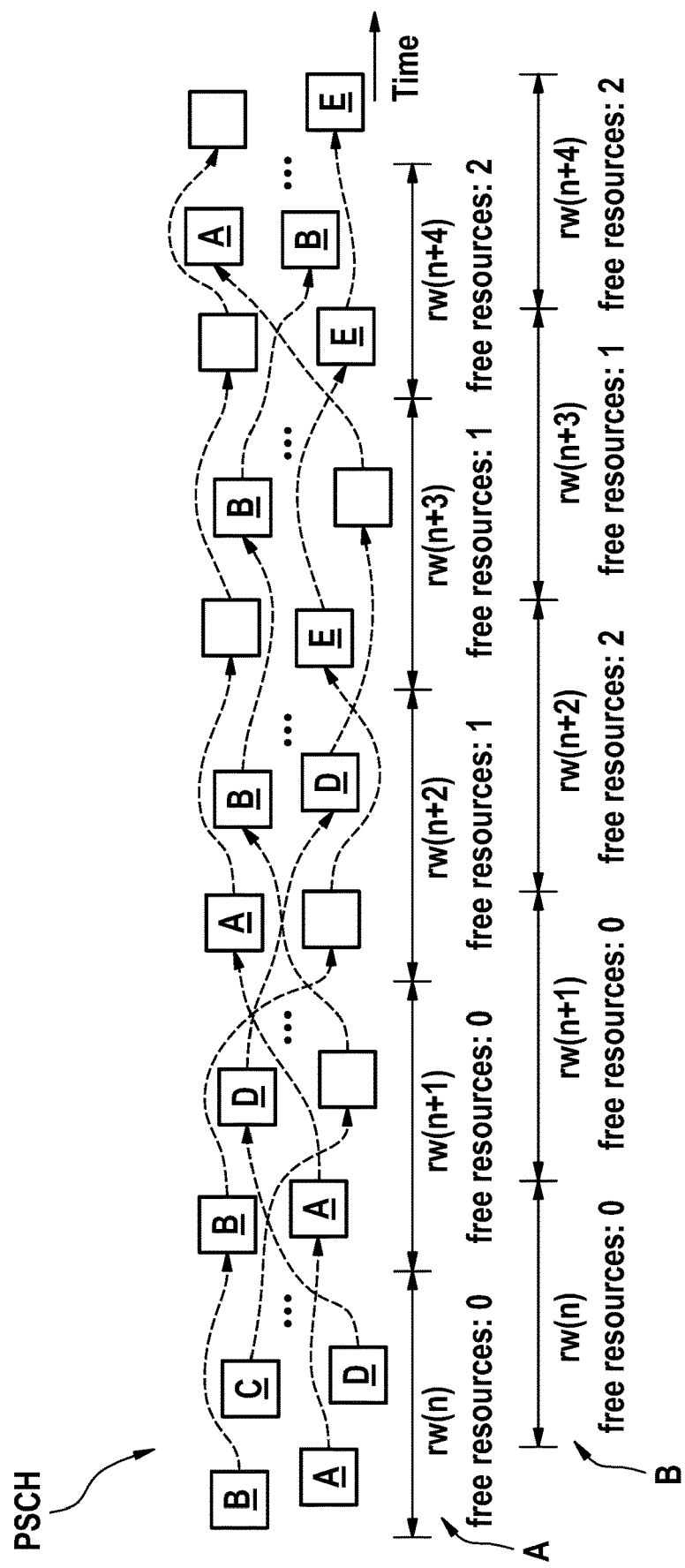

FIG. 7 depicts schematically transmissions via the physical shared radio channel PSCH. Depending on the mapping rules for radio resources to resource chains it is not required for the described radio access mechanism to work properly that all wireless network units synchronize their resource windows. For example, the wireless network units A and B do not align the resource windows rw in time domain.

However, all wireless network units must share a common view on the chains of radio resources, i.e. the peer radio resource in a succeeding resource window rw belonging to a certain radio resource must always be the same for all wireless network units, e.g. the peer radio resource of the top left radio resource in the second resource window rw(n+1) of wireless network unit A is the bottom left radio resource in the third resource window rw(n+2) as seen by wireless network unit A. The same relationship for these both radio resources also holds for wireless network unit B where the top right radio resource in the first resource window rw(n) of wireless network unit B has the bottom right in the second resource window rw(n+1) as its peer resource.

Figure 8:
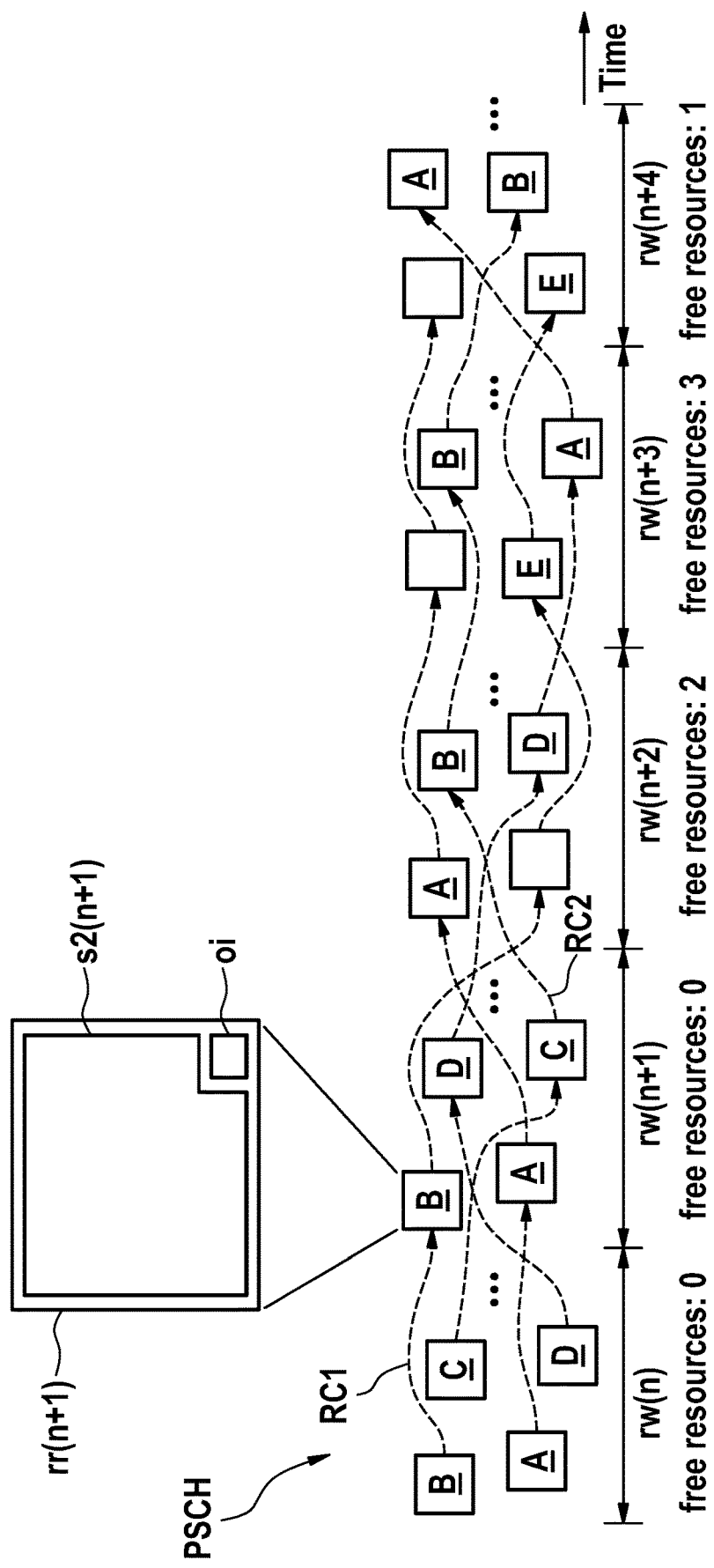

FIG. 8 depicts schematically transmissions via the physical shared radio channel PSCH. The wireless network unit B determines an occupation information oi indicating the next unoccupied radio resource of the resource chain RC1. The network unit B transmits the occupation information oi together with the segment s2(n+1) via the radio resource rr(n+1) of the resource chain RC1. Therefore, the occupation information oi is transmitted via the at least one radio resource rr together with at least one of the plurality of segments.

By monitoring the occupation information oi the other network units detect that the radio resource rr(n+1) used for transmission of a segment by the network unit B in the resource window rw(n+1) is the transmission end resource. Consequently, the network unit B transmits via the occupation information, that the next radio resource of the resource chain RC1 in the resource window rw(n+2) can be used by any network unit as a candidate resource for a transmission. In this example, the free radio resource of the resource chain RC1 remains unused in the resource window rw(n+2).

Also, wireless network unit C signals the next unoccupied resource of the resource chain RC2 via the corresponding radio resource in resource window rw(n+1). The wireless network unit B uses the next unoccupied radio resource of resource chain RC2 in subsequent resource window rw(n+2) as a transmission start resource.

The number of free resources per resource window rw is indicated in FIG. 8. In the first two resource windows rw(n) and rw(n+1) there are no radio resources becoming free, but in the third resource window rw(n+2) two of them are becoming free and from which one of them is used for a new transmission by wireless network unit B. In the following resource window rw (n+3) two further radio resources are becoming free, while the third one was already free in the previous resource window rw(n+2). Two radio resources are used for new transmission by wireless network units A and E. The third radio resource stays free, also in the last resource window rw(n+4) shown. Therefore, a reliable detection of free radio resources is provided.

If the number of radio resources needed to transmit a certain data entity is provided as side information, cf. the occupation information above, within the radio resources and all wireless network units decode all radio resources, which requires a complete receiver chain at all wireless network units, each one of the wireless network units is able to determine which one of the radio resources is becoming to be free and thus candidate resources at the beginning of a resource window. Then, the respective wireless network unit picks one of these candidate resources in case segments of a new data entity need to be sent. The same applies if, alternatively, the transmission of data entities always requires the same number of radio resources (requiring to continuously monitor which radio resources are used to generate the needed set of candidate resources), i.e. the data entities are all of similar size.

Figure 9:
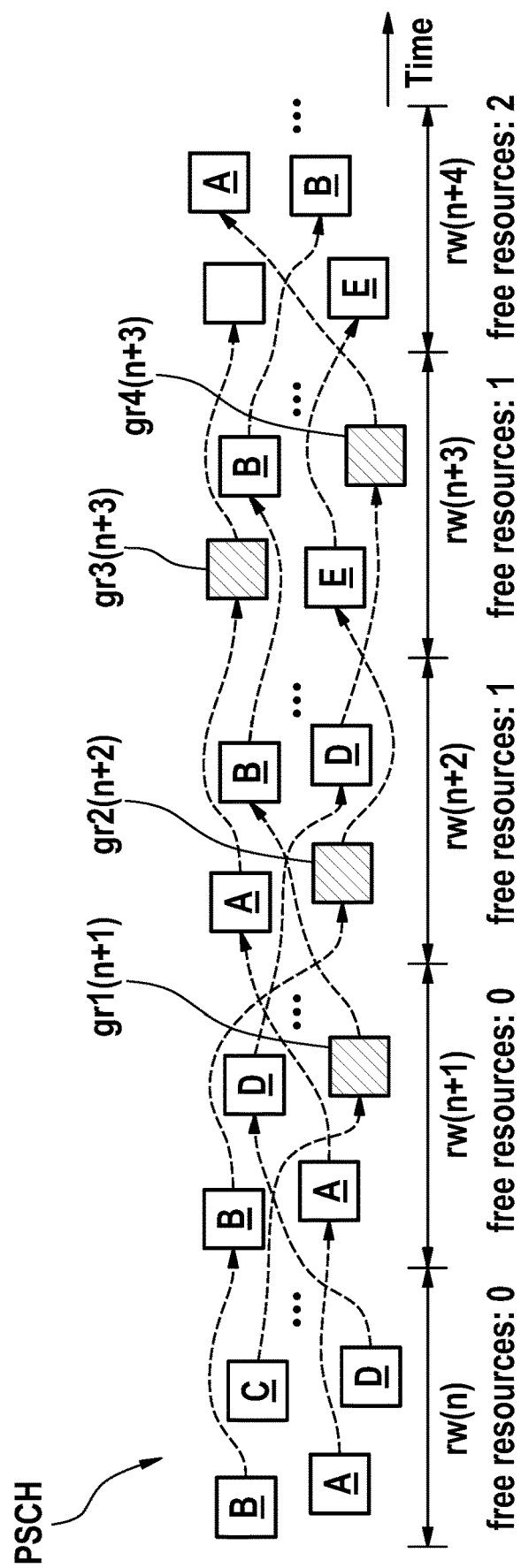

FIG. 9 depicts schematically transmissions via the physical shared radio channel PSCH. In this example, the occupation information of is determined and transmitted after the transmission of the plurality of the determined segments as one unoccupied radio resource gr1(n+1), gr2(n+2), gr3(n+3), gr4(n+3) of the resource chain RC, generally referred to with reference numeral gr. For example, unoccupied radio resources gr3(n+3), gr4(n+3) indicate two free resources in the subsequent resource window rw(n+4).

Assessing the free radio resources per resource window rw as described for example with respect to FIG. 3 or 8 requires some effort that might be avoided. By introducing the unoccupied radio resources gr also called guard resource continuously monitoring or decoding radio resources is not required, anymore. One of the radio resources is assumed to be free within a resource window rw if on the according peer radio resource of the resource chain RC in the previous resource window rw no transmission has taken place (marked by a hatched box). For example, as the radio resource on the bottom right of the second resource window rw(n+1) is not used all wireless network units assess the corresponding radio resource in the third resource window rw(n+2) being free for use and thus a candidate resource. While this optional guard resource mechanism reduces the effort for finding free radio resources (only one complete resource window rw needs to be monitored to assess which resources are free) it clearly reduces the resource efficiency compared to the case when no guard resources are used. However, simulations show that the maximum normalized overall system throughput is still greater than 60% for a fixed number of ten segments per data entity. This is consistent as only one out of eleven radio resources is wasted, leading to about 91% efficiency compared to the case where no guard resources are used.

Figure 10:
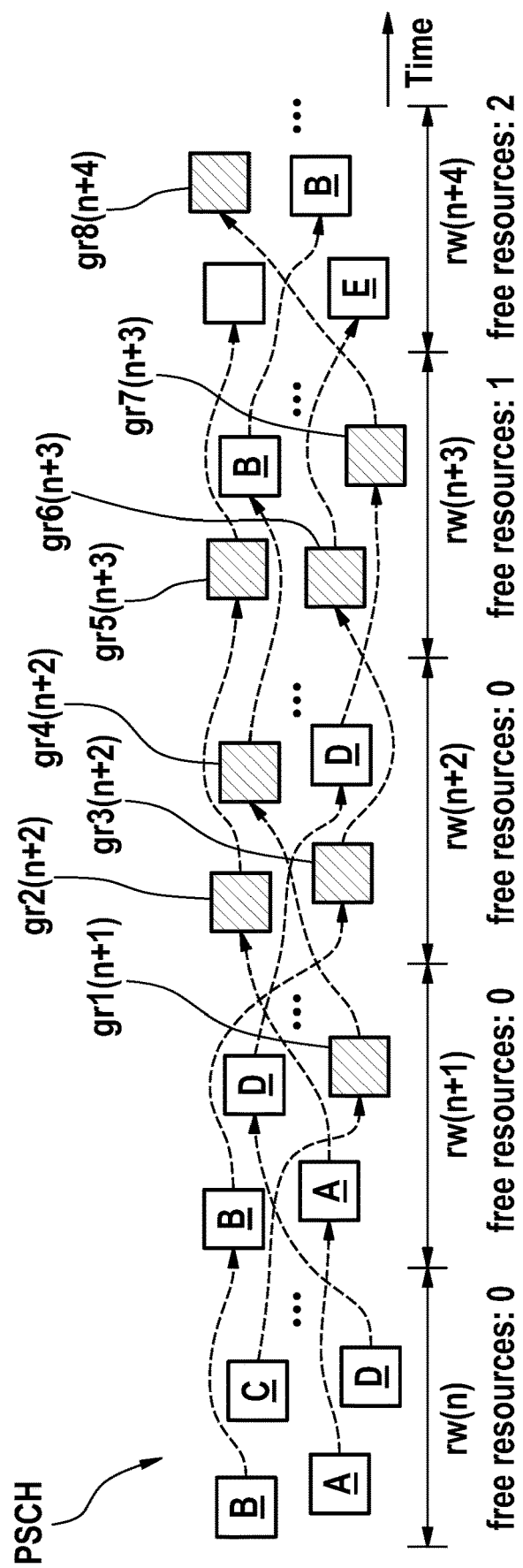

FIG. 10 depicts schematically transmissions via the physical shared radio channel PSCH. In this example, the occupation information of is determined and transmitted after the transmission of the plurality of the determined segments as two subsequent unoccupied radio resources gr of the resource chain RC.

Accordingly, a plurality of subsequent guard resources along a resource chain are used to properly assess and determine candidate resources. The number of guard resources gr within a resource chain RC can be increased as exemplary shown for two guard resources. For sure, the resource efficiency is further reduced.

According to an example, different numbers of guard resources gr before assessing a resource as a candidate resource are used to differentiate different transmission priorities, i.e. providing some kind of Quality of Service (QoS) support. Transmissions for which a wireless network unit only uses a single guard resource have a higher transmission priority as transmissions for which two guard resources are required. This is exemplified further in FIG. 11.

Figure 11:
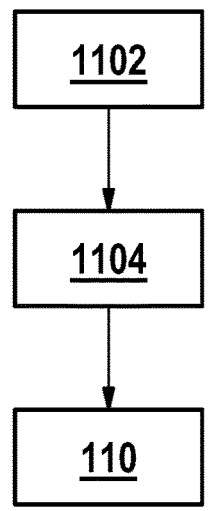
FIGS. 11-13 each depicts a schematic block diagram.

FIG. 11 depicts a schematic block diagram to operate one of the wireless network units described above. According to a step 1102 the wireless network unit determines a transmission priority for the determined data. This transmission priority depends, for example, on the type of data. Sensor data is transmitted via a low transmission priority. Alarm data is transmitted via a high transmission priority.

According to a step 1104 the wireless network unit determines a number of unoccupied radio resources along at least one resource chain. According to a step 110 the wireless network unit determines the plurality of candidate resources in the second resource window of the physical shared radio channel in dependence on the determined transmission priority and in dependence on the determined number of unoccupied radio resource along the respective at least one resource chain. With reference to FIG. 10 the number of unoccupied radio resources is used for establishing a distributed prioritization of transmissions.

For example, for the transmission of the mentioned alarm data the corresponding candidate resources are determined considering all resource chains having at least one unoccupied radio resource following the last occupied radio resource, i.e. starting with the second unoccupied radio resource of the resource chains. For the transmission of the mentioned sensor data the corresponding candidate resources are determined considering all resource chains having at least two unoccupied radio resource following the last occupied radio resource, i.e. starting with the third unoccupied radio resource of one of the resource chains.

Of course, the transmission of the occupation information via the transmission end resource and the subsequent unoccupied resources to provide some kind of QoS support can be combined.

Figure 12:
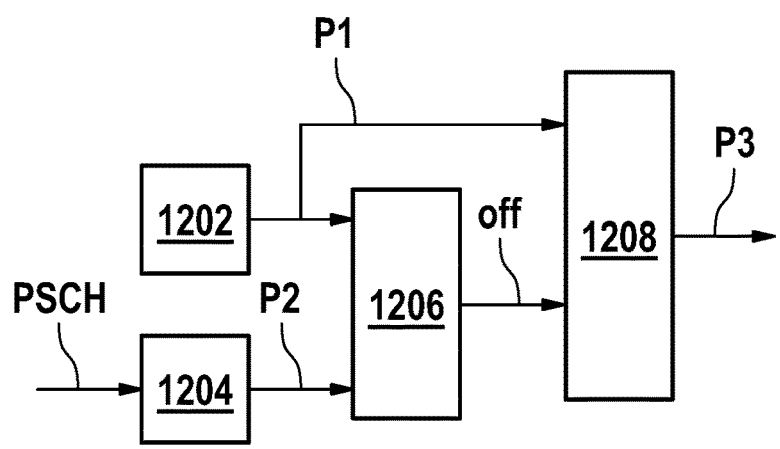

FIG. 12 depicts a schematic block diagram to operate one of the wireless network units for determining a synchronized pattern P3 of a plurality of resource chains. Especially the borders of the resource windows rw are determined by this synchronization scheme.

Of course, further synchronization schemes are possible. For example, if the mapping from radio resources to resource chains is selected appropriately, it is not necessary to synchronize the resource windows between the network units, cf. FIG. 7.

The wireless network unit determines according to a step 1202 or provides a first pattern P1 of the plurality of resource chains RC of the physical shared radio channel PSCH. The first pattern is provided as a plurality of bitmaps or a multi-dimensional bitmap with the radio resources mapped to resource chains. In another example, the first pattern is provided as a calculation rule. For example, a multi-dimensional bitmap has the dimensions resource chains, radio resources.

According to a step 1204 the network unit determines a second pattern P2 of the plurality of resource chains in dependence on monitoring the physical shared radio channel PSCH, in particular via the monitored radio resources which reside in the not yet detected radio resource windows rw.

The wireless network unit determines in a step 1206 an offset off between the first and second pattern P1, P2.

The wireless network unit determines according to a step 1208 the synchronized third pattern P3 of the plurality of resource chains in dependence on the first pattern P1 and in dependence on the determined offset off in order to identify the resource chains of the physical shared radio channel PSCH.

Figure 13:
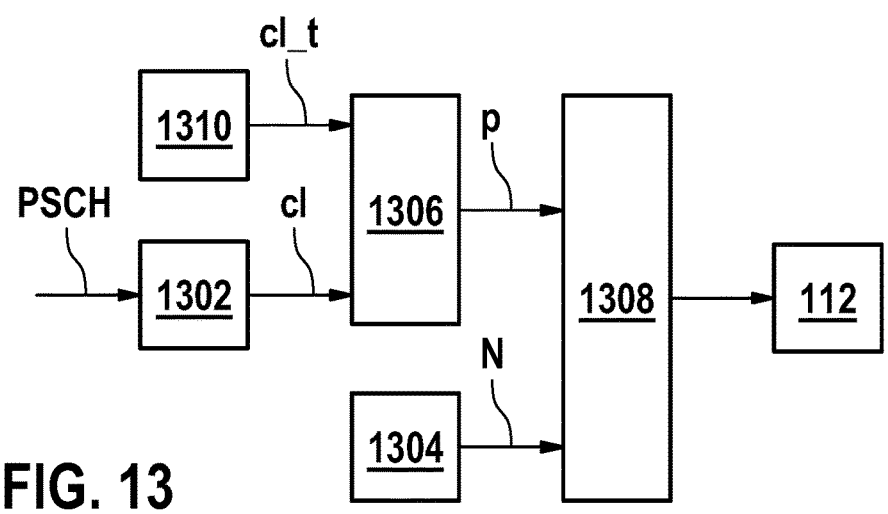

FIG. 13 depicts a schematic block diagram as an example to operate one of the wireless network units in order to select one of the plurality of candidate resources. The network unit determines according to a step 1302 a congestion level c1 of the physical shared radio channel PSCH in dependence on the monitoring of the at least one first radio resource window rw. The selection according to step 112 of one of the plurality of candidate resources as a transmission start resource is made in dependence on the determined congestion level c1.

In detail, the network unit determines randomly or pseudo-randomly according to a step 1304 a transmission probability N. According to a step 1306 the wireless network unit determines a threshold p in dependence on the determined congestion level c1.

According to a step 1308 the wireless network unit compares the determined transmission probability N and the determined threshold p with each other. According to the step 112 the wireless network unit selects one of the plurality of candidate resources rr12, rr22 as a transmission start resource, in this example the candidate resource r12, in dependence on the comparison 1308.

According to step 1310 the wireless network unit determines or provides a target congestion level c1_t. This target congestion level c1_t is determined for example a priori and therefore fixed during operation of the wireless network unit. According to a step 1306 the wireless network unit determines the threshold p by reducing the threshold p if the determined congestion level c1 is below the target congestion level c1_t or by increasing the threshold p if the determined congestion level c1 is above the target congestion level c1_t.

Therefore, by implementing the transmission probability N a conditional access mechanism is provided which defers some wireless network units from starting to transmit new data entities. Ongoing transmissions of data entities where not all segments already have been transmitted are not interrupted. This mechanism enables controlling the collision probability of data entities in transmission and/or controlling the overall system load level. The maximum overall system throughput is, e.g., reached only for a certain overall system load level. For lower and also for higher levels the overall system throughput is smaller. So, if the overall system throughput shall be maximized a certain overall system load level needs to be targeted, potentially requiring some wireless network units not to start the transmission of new data entities.

The conditional access mechanism performed in each wireless network unit comprises at least two steps: Firstly, the congestion level, for example a value of a parameter which has a fixed relationship to the current system load level (from which also the current collision probability can be derived) needs to be assessed. Secondly, according to the measured value of the congestion level each wireless network unit adapts its channel access in a way so that all the wireless network units in the vicinity together approach the desired system load level, which in turn requires to approach the corresponding target congestion level c1_t.

For example, there are at least two different values representing a congestion level which can be easily measured and which have a fixed relationship to the system load level: Firstly, the radio resource usage can be measured as the ratio of used radio resources per resource window rw. Secondly, the ratio of free radio resources available for transmission of new data entities (guard resources are ignored) per resource window can be assessed, namely the candidate resources. The number of candidate resources is already available at each wireless network unit as each wireless network unit needs to determine free radio resources per resource window for the channel access mechanism.

Both values calculated for the same resource window do not sum up to one because the radio resource usage ratio is determined at the end of a resource window period and the free radio resource ratio at the beginning of a resource window period. The values can be monitored, continuously, for all resource windows. However, to save energy, e.g. for battery powered sensor nodes, this monitoring can be performed also only on demand. For example, if a sensor knows in advance when the next data entity is to be sent, the wireless network unit may start some resource window periods ahead of time the according monitoring process, so that when the new data entity is ready to be sent an up-to-date value is available. Alternatively, the wireless network unit may start the monitoring process only if a new data entity is to be sent and delays the possible transmission until it has monitored the physical shared radio channel for several resource window periods and can determine an up-to-date value.

An exemplary formula to calculate the up-to-date value $v_{average}$ based on measurements of several consecutive resource window periods is exemplified in equation 1, wherein $v_{current}$ is the value calculated for the current resource window in case the free radio resource ratio is used and for the previous resource window in case the radio resource usage ratio is used, respectively, and a fixed value for a (0<a<=1).

$$v_{average}=a*v_{current}+(1-a)*v_{average}-1 \qquad (1)$$

Depending of the up-to-date value $v_{average}$ the wireless network unit decides how to adapt the channel access. An exemplary mechanism for adapting the channel access is the determination of the threshold p (0<p<=1) which represents the probability with which the respective wireless network unit shall start the transmission of a new data entity waiting in its queue to be sent. So, in case the data entity is waiting to be sent, the wireless network unit determines the random number N (0<=N<1) and checks if it is smaller or greater than the threshold p. If the random number N is smaller than the threshold p, the wireless network unit starts the transmission, otherwise not. This procedure is repeated for each succeeding resource window period until, finally, the data entity is started to be sent. Of course, the threshold comparison operations can be done the other way round.

The threshold p is adapted according to the up-to-date value $v_{average}$ measured in the first step of the conditional access mechanism, e.g. the measured radio resource usage ratio or free radio resource ratio. In case the free radio resource ratio is measured and the up-to-date value $v_{average}$ is smaller than the targeted threshold p needs to be reduced, e.g. by equation 2, wherein the max-function returns the maximum of both parameters, the first parameter b is limited by 0<b<1 and the second parameter $p_{min}$ is a minimum probability as lower bound.

$$p=\max(b*p,p_{min}) \qquad (2)$$

Otherwise, the threshold p needs to be increased, e.g. by equation 3, wherein the min-function returns the minimum of both parameters with c>1.0.

$$p=\min(c*p,1.0) \qquad (3)$$

If the radio resource usage ratio is measured the threshold p needs to be reduced if the current up-to-date value $v_{average}$ is greater than the targeted one and increased, otherwise.

The target radio resource usage ratio and the target free radio resource ratio, respectively, corresponding to a certain target system load level can be calculated analytically for fixed numbers of segments per data entity (all data entities are of similar size) and a fixed number of guard resources, typically numerically for a variable number of segments per data entity (depending on data entity size) following a certain probability distribution and a fixed number of guard resources and by simulation otherwise. For a fixed number of segments per data entity and if no guard resources are used the maximum system throughput is reached for a normalized system load level of 1.0. Assuming a fixed number of 10 segments per data entity this yields a free radio resource ratio of about 0.25 and a radio resource usage ratio of about 0.83. First simulations for these numbers show promising results if the mentioned exemplary methods to determine the free radio resource ratio and the threshold p are used. The overall system throughput reaches levels only a few percentage points below the optimum under stationary state conditions, i.e. when all wireless network units always have at least one data entity in their queues waiting to be sent.

Figure 14:
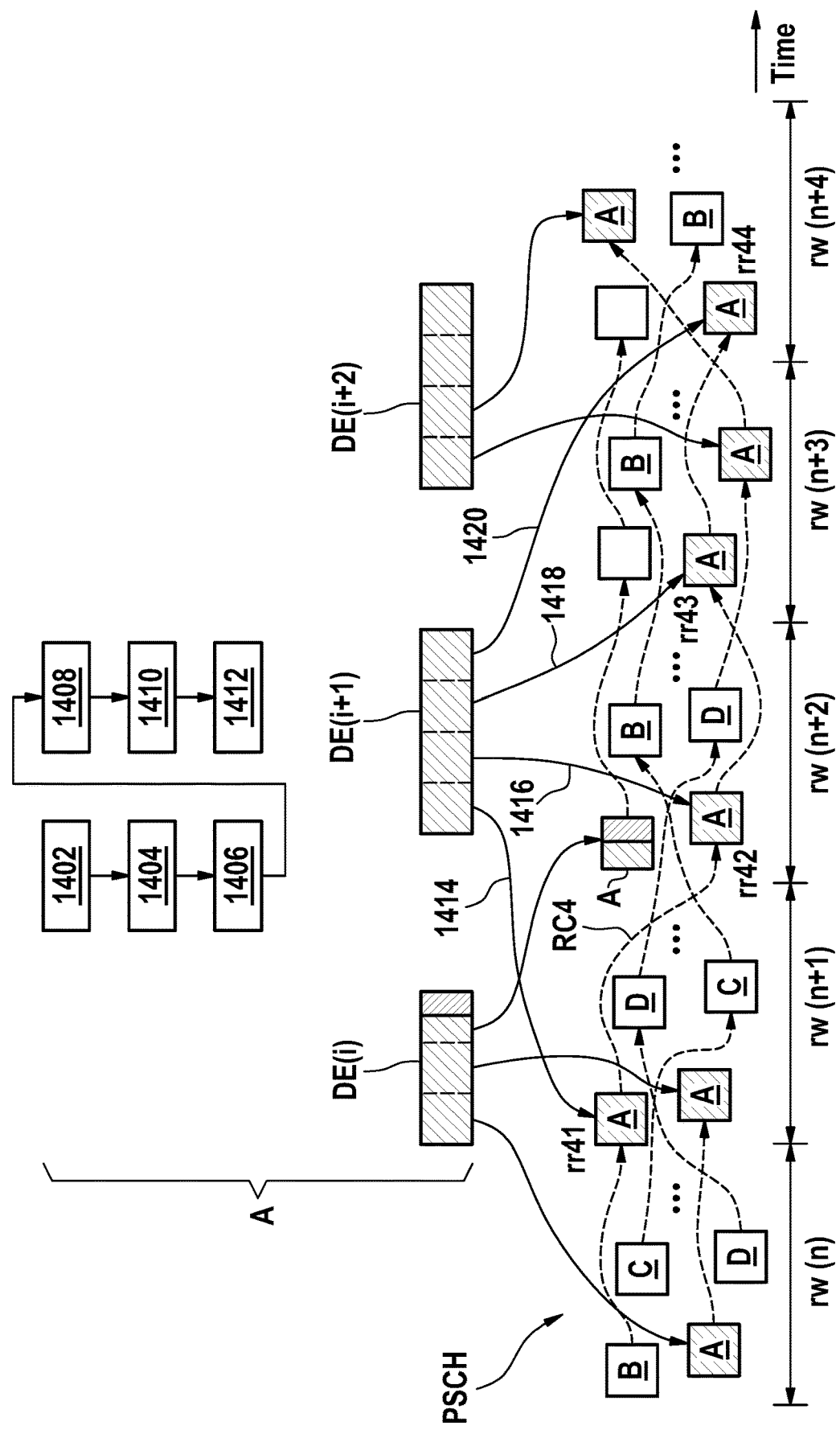

FIG. 14 depicts schematically transmissions via the physical shared radio channel PSCH. After the start of the transmission of the segments of the data entity DE(i) in the resource window rw(n) a further transmission of the data entity DE(i+1) is started by the wireless network unit A in the subsequent resource window rw(n+1).

According to a step 1402 the wireless network unit A determines the further data entity DE(i+1) intended to be transmitted via the physical shared radio channel PSCH. According to a step 1404 the wireless network unit determines a plurality of segments of the determined further data entity DE(i+1).

The wireless network unit A determines in a step 1406 at least the second radio resource window rw(n) of the physical shared radio channel PSCH. The wireless network unit A monitors according to a step 1408 at least the second radio resource window rw(n).

The wireless network unit A determines according to a step 1410 a plurality of candidate resources, presently only radio resource rr41, in a resource window rw(n+1) in dependence on monitored radio resources of at least the second radio resource window rw(n). Each candidate resource of the plurality of candidate resources is part of at least one of the resource chains of the physical shared radio channel.

Then, the wireless network unit A selects in a step 1412 one of the plurality of candidate resources, in this example the radio resource rr41, as a transmission start resource. A transmission of the segments is conducted in steps 1414, 1416, 1418, 1420 via radio resources rr41-rr44 along the resource chain RC4 to which the selected transmission start resource rr41 belongs to, wherein a single one of the segments is transmitted via a single one of the radio resources rr41-rr44 of the resource chain RC4.

Therefore, the wireless network unit A is able to transmit on more than a single radio resource per resource window rw to avoid overloading of internal buffers and to reduce transmission delays. However, the wireless network unit A will always stick to the described channel access mechanism, i.e. it has to perform the channel access mechanism for each data entity individually as if it is the only one to be transmitted.

The wireless network unit A transmits subsequent segments of the data entities on subsequent peer radio resources as for a single data entity. Otherwise, the collision probability will increase, e.g. if wireless network unit A would use both radio resources in resource window rw (n+1) to transmit the second and the third segment of the first data entity DE(i) and two radio resources in the third resource window rw(n+2) to transmit the first and the second segment of the second data entity DE(i+1) it is sufficient that one of the resource chains RC is in a collision state so that both data entities are not successfully transmitted.

Figure 15:
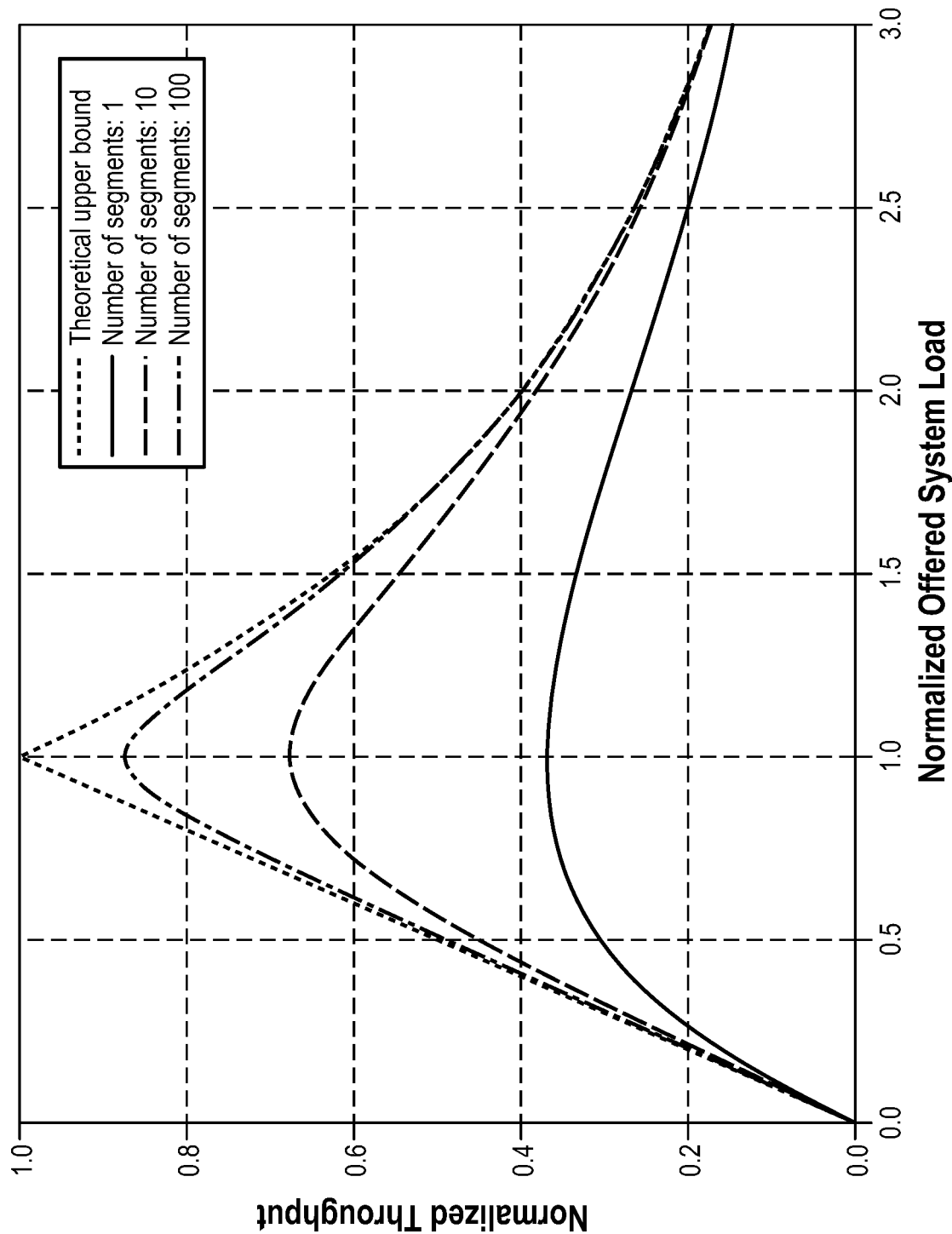
FIGS. 15 and 16 each depict analytic results.

Analytic results according to FIG. 15 reveal that the overall throughput increases the more segments are required on average to transmit a single data entity. FIG. 15 shows for different numbers of segments per data entity the normalized overall throughput over normalized offered system load. The case where only one segment per data entity is used equals the case of a slotted ALOHA channel access mechanism. The theoretical upper bound shows the throughput in case an infinite number of segments per data entity is used. For a slotted ALOHA channel access mechanism, the maximum normalized overall throughput is about 0.36 at an offered load of 1.0 as shown in the FIG. 15. For ten segments per data entity the throughput increases to about 0.68 and for hundred segments per data entity to about 0.87, asymptotically reaching 1.0 for an infinite number of segments per data entity. Simulation results confirm these findings.

Figure 16:
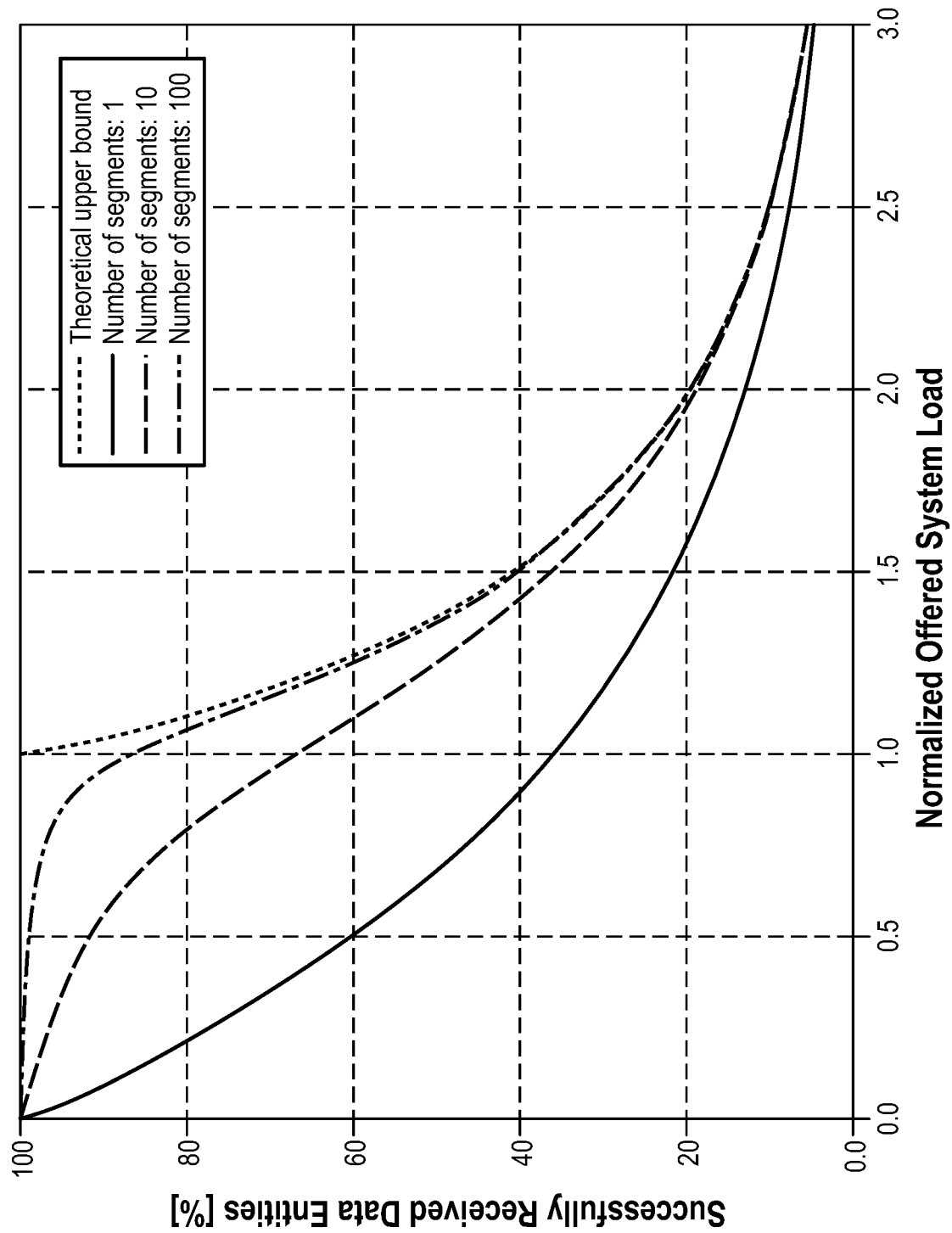

Accordingly, the probability of successful reception of a data entity increases with an increasing number of segments needed to transmit a single data entity. FIG. 16 shows the percentage of successfully received data entities over normalized offered system load. Again, the case where only one segment per data entity is used equals the case of a slotted ALOHA channel access mechanism and the theoretical upper bound shows the percentage of correctly received data entities in case an infinite number of segments per data entity is used. For an offered load of 1.0 the percentage of correctly received data entities is about 36% in case a slotted ALOHA compliant channel access mechanism is applied. This percentage increases to about 68% for ten segments per data entity and to about 87% for hundred segments per data entity, reaching 100% for an infinite number of segments per data entity. It can be seen that for all levels of offered load the percentage values are greater the greater the number of segments per data entity is.

The invention claimed is:

1. A first wireless network unit (A) of a radio telecommunications network (RTN), wherein the first wireless network unit (A) comprises at least one data circuitry (dcA), at least one communication circuitry (ccA) and at least one antenna (aA), wherein the at least one data circuitry (dcA) is configured to interact with the at least one communication circuitry (ccA) and the at least one antenna (aA), so that the first wireless network unit (A) determines (102) a data entity (DE) intended to be transmitted via a physical shared radio channel (PSCH);

determines (104) a plurality of segments of the determined data entity (DE);
  determines (106) at least one first radio resource window (rw(n−1)) of the physical shared radio channel (PSCH);
  monitors (108) the at least one first radio resource window (rw(n−1));
  determines (110) a plurality of candidate resources (rr12, rr22) in a second resource window (rw(n)) of the physical shared radio channel (PSCH) in dependence on monitored radio resources (rr11, rr21) of the at least one first radio resource window (rw(n−1)), wherein each candidate resource (rr12, rr22) of the plurality of candidate resources (rr12, rr22) is part of a resource chain (RC1, RC2) of the physical shared radio channel (PSCH);
  selects (112) one of the plurality of candidate resources (rr12, rr22) as a transmission start resource (rr12); and
  transmits (114, 116, 118) the plurality of the determined segments of the data entity (DE) via radio resources (rr12, rr13, rr14) along the resource chain (RC1) to which the selected transmission start resource (rr12) belongs to, wherein a single one of the segments is transmitted via a single one of the radio resources (rr12, rr13, rr14) of the resource chain (RC1).

2. The first wireless network unit (A) according to claim 1, wherein the first wireless network unit (A)

determines an occupation information (oi) indicating the next unoccupied radio resource of the resource chain (RC1); and transmits the occupation information (oi) via at least one radio resource (rr) of the resource chain (RC1).

3. The first wireless network unit (A) according to claim 2, wherein the occupation information (oi) is transmitted via the at least one radio resource (rr) together with at least one of the plurality of segments.

4. The first wireless network unit (A) according to claim 2, wherein the occupation information (oi) is transmitted after the transmission of the plurality of the determined segments as at least one unoccupied radio resource (gr) of the resource chain (RC).

5. The first wireless network unit (A) according to claim 4, wherein the first wireless network unit (A)

determines (1102) a transmission priority for the determined data;

determines (1104) a number of unoccupied radio resources along at least one resource chain (RC); and determines (110) the plurality of candidate resources in the second resource window (rw(n)) of the physical shared radio channel (PSCH) in dependence on the determined transmission priority and in dependence on the determined number of unoccupied radio resource along the respective at least one resource chain.

6. The first wireless network unit (A) according to claim 1, wherein the number of radio resources per transmission along the resource chain is limited by a maximum number of radio resources, and wherein the first wireless network unit (A)

determines the plurality of segments of the determined data entity (DE) in dependence on the maximum number, wherein the plurality of segments for a single transmission along the resource chain comprise at least a part of the data entity (DE) and/or a part of at least one of the plurality of segments for the single transmission is filled with padding data.

7. The first wireless network unit (A) according to claim 1, wherein the first wireless network unit (A)

determines (1202) or provides a first pattern (P1) of the plurality of resource chains (RC) of the physical shared radio channel (PSCH);

determines (1204) a second pattern (P2) of the plurality of resource chains in dependence on monitoring the physical shared radio channel (PSCH), in particular via the monitored radio resources of the at least one first radio resource window (rw(n−1)) which reside at least partly in the not yet detected radio resource windows (rw);

determines (1206) an offset (off) between the first and second pattern (P1, P2); and determines (1208) a synchronized third pattern (P3) of the plurality of resource chains in dependence on the first pattern (P1) and in dependence on the determined offset (off) in order to identify the resource chains of the physical shared radio channel (PSCH).

8. The first wireless network unit (A) according to claim 1, wherein the first wireless network unit (A)

determines (1302) a congestion level (c1) of the physical shared radio channel (PSCH) in dependence on the monitoring of the at least one first radio resource window (rw(n−1)); and selects (112) one of the plurality of candidate resources (rr12, rr22) as a transmission start resource (r12) in dependence on the determined congestion level (c1).

9. The first wireless network unit (A) according to claim 8, wherein the first wireless network unit (A)

randomly or pseudo-randomly determines (1304) a transmission probability (N);

determines (1306) a threshold (p) in dependence on the determined congestion level (c1);

compares (1308) the determined transmission probability (N) and the determined threshold (p) with each other; and selects (112) one of the plurality of candidate resources (rr12, rr22) as a transmission start resource (r12) in dependence on the comparison (1308).

10. The first wireless network unit (A) according to claim 9, wherein the first wireless network unit (A)

determines or provides (1310) a target congestion level (c1_t); and adapts (1306) the threshold (p) in dependence on the target congestion level (c1_t).

11. The first wireless network unit (A) according to claim 1, wherein the first wireless network unit (A)

determines (1402) a further data entity (DE(i+1)) intended to be transmitted via the physical shared radio channel (PSCH);

determines (1404) a plurality of segments of the determined further data entity (DE(i+1));

determines (1406) at least the second radio resource window (rw(n)) of the physical shared radio channel (PSCH);

monitors (1408) at least the second radio resource window (rw(n));

determines (1410) a plurality of candidate resources (rr41) in a third resource window (rw(n+1)) of the physical shared radio channel (PSCH) in dependence on monitored radio resources (rr12, rr22) of at least the second radio resource window (rw(n)), wherein each candidate resource (rr41) of the plurality of candidate resources is part of a resource chain (RC4) of the physical shared radio channel (PSCH);

selects (1412) one of the plurality of candidate resources (rr41) as a transmission start resource (rr41); and transmits (1414, 1416, 1418, 1420) the plurality of the determined segments of the data entity (DE(i+1)) via radio resources (rr41-rr44) along the resource chain (RC4) to which the selected transmission start resource (rr41) belongs to, wherein a single one of the segments is transmitted via a single one of the radio resources (rr41-rr44) of the resource chain (RC4).

12. The first wireless network unit (A) according to claim 1, wherein the first wireless network unit (A)

randomly or pseudo-randomly selects (112) the one of the plurality of candidate resources (rr12, rr22) as a transmission start resource (rr12).

13. A method to operate a first wireless network unit (A) of a radio telecommunications network, wherein the method comprises:

determining (102) a data entity (DE) intended to be transmitted via a physical shared radio channel (PSCH);

determining (104) a plurality of segments of the determined data entity (DE);

determining (106) at least one first radio resource window (rw(n−1)) of the physical shared radio channel (PSCH);

monitoring (108) the at least one first radio resource window (rw(n−1));

determining (110) a plurality of candidate resources (rr12, rr22) in a second resource window (rw(n)) of the physical shared radio channel (PSCH) in dependence on monitored radio resources (rr11, rr21) of the at least one first radio resource window (rw(n−1)), wherein each candidate resource (rr12, rr22) of the plurality of candidate resources (rr12, rr22) is part of a resource chain (RC1, RC2) of the physical shared radio channel (PSCH);

selecting (112) one of the plurality of candidate resources (rr12, rr22) as a transmission start resource (rr12); and transmitting (114, 116, 118) the plurality of the determined segments of the data entity (DE) via radio resources (rr12, rr13, rr14) along the resource chain (RC1) to which the selected transmission start resource (rr12) belongs to, wherein a single one of the segments is transmitted via a single one of the radio resources (rr12, rr13, rr14) of the resource chain (RC1).

14. A second wireless network unit (B) of a radio telecommunications network (RTN), wherein the second wireless network unit (B) comprises at least one data circuitry (dcB), at least one communication circuitry (ccB) and at least one antenna (aB), wherein the at least one data circuitry (ccB) is configured to interact with the at least one communication circuitry (ccB) and the at least one antenna (aB), so that the second wireless network unit (B)

monitors (220) a second radio resource window (rw(n));

determines (222) that at least one of a plurality of candidate resources (rr12, rr22) of the second radio resource window (rw(n)) is a transmission start resource (rr12);

receives (214, 216, 218) a plurality of segments via radio resources (rr12, rr13, rr14) along a resource chain (RC1) to which the determined transmission start resource (rr12) belongs to, wherein a single one of the segments is received via a single one of the radio resources (rr12, rr13, rr14) of the resource chain (RC1); and determines (224) a data entity (DE) in dependence on the plurality of received segments.

15. A method to operate a second wireless network unit (B) of a radio telecommunications network, wherein the method comprises:

monitoring (220) a second radio resource window (rw(n));

determining (222) that at least one of a plurality of candidate resources (rr12, rr22) of the second radio resource window (rw(n)) is a transmission start resource (rr12);

receiving (214, 216, 218) a plurality of segments via radio resources (rr12, rr13, rr14) along a resource chain (RC1) to which the determined transmission start resource (rr12) belongs to, wherein a single one of the segments is received via a single one of the radio resources (rr12, rr13, rr14) of the resource chain (RC1); and determining (224) a data entity (DE) in dependence on the plurality of received segments.

16. A radio telecommunications network comprising the first wireless network unit claim 1 and a second wireless network unit, wherein the second wireless network unit (B) comprises at least one data circuitry (dcB), at least one communication circuitry (ccB) and at least one antenna (aB), wherein the at least one data circuitry (ccB) is configured to interact with the at least one communication circuitry (ccB) and the at least one antenna (aB), so that the second wireless network unit (B)

monitors (220) a second radio resource window (rw(n));

determines (222) that at least one of a plurality of candidate resources (rr12, rr22) of the second radio resource window (rw(n)) is a transmission start resource (rr12);

receives (214, 216, 218) a plurality of segments via radio resources (rr12, rr13, rr14) along a resource chain (RC1) to which the determined transmission start resource (rr12) belongs to, wherein a single one of the segments is received via a single one of the radio resources (rr12, rr13, rr14) of the resource chain (RC1); and determines (224) a data entity (DE) in dependence on the plurality of received segments.

\* \* \* \* \*